(12) United States Patent
Park

(10) Patent No.: US 8,855,883 B2
(45) Date of Patent: Oct. 7, 2014

(54) LANE-CHANGE ASSISTANCE SYSTEM OF VEHICLE AND LANE-CHANGE ASSISTANCE METHOD THEREOF

(71) Applicant: Mando Corporation, Gyeonggi-do (KR)

(72) Inventor: Man Bok Park, Gyeonggi-Do (KR)

(73) Assignee: Mando Corporation, Pyeongtaek-si, Gyeonggi-do (KR)

( * ) Notice: Subject to any disclaimer, the term of this patent is extended or adjusted under 35 U.S.C. 154(b) by 175 days.

(21) Appl. No.: 13/648,892

(22) Filed: Oct. 10, 2012

(65) Prior Publication Data

US 2013/0090825 A1  Apr. 11, 2013

(30) Foreign Application Priority Data

Oct. 10, 2011  (KR) .................. 10-2011-0102796

(51) Int. Cl.
*G08G 1/16*  (2006.01)
*B60T 8/17*  (2006.01)
*B60W 30/12*  (2006.01)
*B60W 50/16*  (2012.01)

(52) U.S. Cl.
CPC .......... *B60W 30/12* (2013.01); *B60W 2520/10* (2013.01); *B60W 2720/14* (2013.01); *B60W 2550/10* (2013.01); *G08G 1/167* (2013.01); *B60W 2520/28* (2013.01); *B60W 50/16* (2013.01); *B60W 2540/18* (2013.01)

USPC .............................. 701/70; 701/301; 303/146

(58) Field of Classification Search
None
See application file for complete search history.

(56) References Cited

U.S. PATENT DOCUMENTS

| 6,256,561 B1 * | 7/2001 | Asanuma ........................ 701/41 |
| 6,363,309 B1 * | 3/2002 | Irie et al. ........................ 701/70 |
| 2009/0157247 A1 * | 6/2009 | Sjogren et al. ................. 701/23 |
| 2009/0212930 A1 * | 8/2009 | Pfeiffer et al. ................ 340/435 |

FOREIGN PATENT DOCUMENTS

| KR | 10-2012-0030624 | 3/2012 |
| WO | WO2007/082828 A1 * | 7/2007 |

* cited by examiner

*Primary Examiner* — Michael J Zanelli
(74) *Attorney, Agent, or Firm* — McDermott Will & Emery LLP

(57) ABSTRACT

Disclosed herein are a lane-change assistance system of a vehicle and a lane-change assistance method thereof. The lane change assistance system includes a wheel speed sensor to detect a wheel speed of the vehicle, a steering angle sensor to detect a steering angle of the vehicle, and a micro controller unit to calculate, using the wheel speed and the steering angle, a desired yaw rate value required to allow the vehicle to return to an original lane when attempting to move the vehicle to an adjacent lane, but another vehicle in the adjacent lane threatens the corresponding vehicle, to compare the desired yaw rate value with a preset threshold value, and to assist a lane change maneuver of the vehicle based on the comparison result.

14 Claims, 4 Drawing Sheets

LANE-CHANGE ASSISTANCE SYSTEM OF VEHICLE AND LANE-CHANGE ASSISTANCE METHOD THEREOF

CROSS-REFERENCE TO RELATED APPLICATION

This application claims the benefit of Korean Patent Application No. 2011-0102796, filed on Oct. 10, 2011 in the Korean Intellectual Property Office, the disclosure of which is incorporated herein by reference.

BACKGROUND

1. Field

Embodiments of the present invention relate to a lane-change assistance system of a vehicle and a lane-change assistance method thereof.

2. Description of the Related Art

When attempting to change a lane of a traveling vehicle, typically, a driver will first judge the presence of following vehicles in adjacent lanes through side mirrors and distances from the following vehicles with the naked eye, and thereafter will initiate a lane change manoeuvre by operating a steering wheel while maintaining a safe distance.

However, upon implementation of the lane change manoeuvre, judging lane change safety by observing images seen through side mirrors with the naked eye may cause collision accidents by an error of judgment because a distance visually judged through a side mirror may differ from an actual distance.

In particular, if another vehicle in the adjacent lane travels at a higher speed, possibility of lane change collisions due to momentary error of judgment through the side mirrors.

In addition, in the case of traveling at night, light of another vehicle reflected through the side mirrors may make it very difficult to judge a distance from the vehicle and the speed of the vehicle.

The above-described conventional lane change manoeuvre largely depends only on driving skill and experience of the driver, and there is a demand for methods to guarantee safety of the driver and passenger.

SUMMARY

Therefore, it is an aspect of the present invention to provide a lane-change assistance system of a vehicle and a lane-change assistance method thereof, in which when a driver attempts to move a vehicle to an adjacent lane, but another vehicle in the adjacent lane threatens the driver's vehicle, a brake system performs pressure control to return the vehicle to an original lane, thereby keeping the vehicle safe.

Additional aspects of the invention will be set forth in part in the description which follows and, in part, will be obvious from the description, or may be learned by practice of the invention.

In accordance with an aspect of the present invention, a lane change assistance system of a vehicle, includes a wheel speed sensor to detect a wheel speed of the vehicle, a steering angle sensor to detect a steering angle of the vehicle, and a micro controller unit to calculate, using the wheel speed and the steering angle, a desired yaw rate value required to allow the vehicle to return to an original lane when attempting to move the vehicle to an adjacent lane, but another vehicle in the adjacent lane threatens the corresponding vehicle, to compare the desired yaw rate value with a preset threshold value, and to assist a lane change manoeuvre of the vehicle based on the comparison result.

In accordance with another aspect of the present invention, a lane change assistance method of a vehicle, wherein the vehicle includes a wheel speed sensor to detect a wheel speed of the vehicle and a steering angle sensor to detect a steering angle of the vehicle, includes calculating, using the wheel speed and the steering angle, a desired yaw rate value required to allow the vehicle to return to an original lane when attempting to move the vehicle to an adjacent lane, but another vehicle in the adjacent lane threatens the corresponding vehicle, comparing the desired yaw rate value with a preset threshold value, and assisting a lane change manoeuvre of the vehicle based on the comparison result.

BRIEF DESCRIPTION OF THE DRAWINGS

These and/or other aspects of the invention will become apparent and more readily appreciated from the following description of the embodiments, taken in conjunction with the accompanying drawings of which.

DETAILED DESCRIPTION

Figure 1:
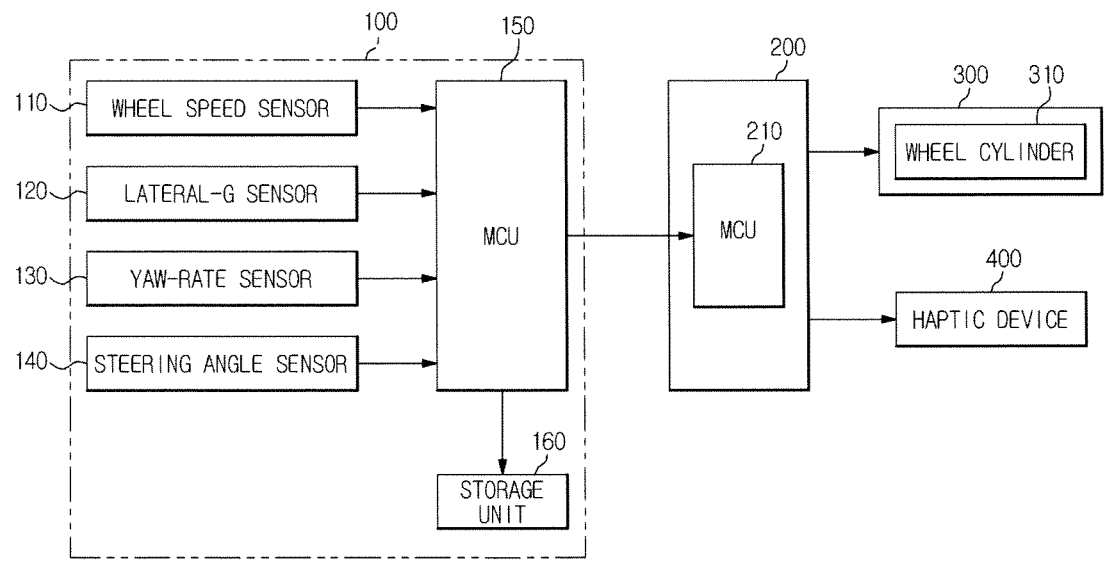
FIG. 1 is a control block diagram illustrating a lane change assistance system of a vehicle according to an embodiment of the present invention.

Reference will now be made in detail to the embodiments of the present invention, examples of which are illustrated in the accompanying drawings, wherein like reference numerals refer to like elements throughout.

As illustrated in FIG. 1, a lane change assistance system 100 of a vehicle according to an embodiment of the present invention includes a wheel speed sensor unit 110, a lateral-G sensor 120, a yaw-rate sensor 130, a steering-angle sensor 140, a Micro Controller Unit (hereinafter referred to as 'MCU') 150, and a storage unit 160.

The wheel-speed sensor unit 110 includes an FL wheel-speed sensor which is installed to a left front wheel of a vehicle to detect the speed of the left front wheel, an FR wheel-speed sensor which is installed to a right front wheel to detect the speed of the right front wheel, an RL wheel-speed sensor which is installed to a left rear wheel to detect the speed of the left rear wheel, and an RR wheel-speed sensor which is installed to a right rear wheel to detect the speed of the right rear wheel. Each wheel-speed sensor of the wheel-speed sensor unit 110 transmits the detected wheel speed to the MCU 150.

The lateral-G sensor 120 is a 2-axis accelerometer that detects vehicle lateral acceleration (lateral-G) that is acceleration of force to cause the vehicle to be pushed laterally during traveling and transmits the detected lateral acceleration to the MCU 150.

The yaw-rate sensor 130 detects a turn rate of the vehicle and transmits the detected turn rate to the MCU 150. When the vehicle rotates about a vertical axis, i.e. about a Z-axis, the yaw-rate sensor 130 electronically detects yaw-moment of the vehicle via vibration change of an internal plate fork thereof. Here, the yaw-moment is inward or outward movement force caused when the vehicle turns leftward or rightward. The yaw-rate sensor 130 contains cesium crystals to generate voltage by rotation of the crystals when the vehicle rotates.

The steering angle sensor 140 detects a steering angle of the vehicle and transmits the detected steering angle to the MCU 150. The steering angle sensor 140 is mounted to a lower end of a steering wheel. The steering angle sensor 140 detects a steering angle of the steering wheel operated by the driver when the vehicle turns and transmits the detected steering angle to the MCU 150. The steering angle sensor 140 also detects a steering speed and steering direction of the steering wheel. The steering angle sensor 140 may be of an optical device type in which a slit plate of the sensor is rotated during steering to transmit or intercept light of an optical device, causing voltage change. The MCU 150 calculates the steering speed, steering direction and steering angle of the steering wheel based on the voltage change transmitted from the steering angle sensor 140.

The MCU 150 serves to control general operations of the lane change assistance system 100 of the vehicle. The MCU 150 calculates a desired yaw rate value required to allow the vehicle to return to an original lane when a driver attempts to move the vehicle to an adjacent lane, but another vehicle in the adjacent lane threatens the corresponding vehicle. Then, the MCU 150 compares the calculated desired yaw rate value with a preset threshold value. The MCU 150 performs heading-angle control if the desired yaw rate value is less than the threshold value, and performs haptic control if the desired yaw rate value is equal to or greater than the threshold value. In this way, the MCU 150 assists a lane change manoeuvre.

The MCU 150 calculates an original yaw-rate value based on the steering angle detected via the steering angle sensor 140 and the vehicle speed detected via the wheel speed sensor 110 as represented by the following Equation 1.

$$\text{Yaw\_Rate}_{Original} = \frac{V}{l_f + l_r + \frac{mV^2(l_r C_{ar} - l_f C_{af})}{2C_{af}C_{ar}L}} \delta \quad \text{Equation 1}$$

here, "$l_f$" is distance from a front-wheel axle to the center of gravity,

"$l_r$" is distance from a rear-wheel axle to the center of gravity,

"$C_{af}$" is front-wheel cornering stiffness,

"$C_{ar}$" is rear-wheel cornering stiffness,

"L" is $l_f+l_r$,

"m" is mass

"$\delta$" is steering angle, and

"V" is longitudinal wheel-speed.

The MCU 150 calculates a desired yaw rate value, which must be acquired to allow the vehicle to return to an original lane when a driver attempts to move the vehicle to an adjacent lane, but another vehicle in the adjacent lane threatens the corresponding vehicle, using the following Equation 2.

$$\dot{\psi}_{des} = \text{Yaw\_Rate}_{Original} + \text{Yaw\_Rate}_{Target} \quad \text{Equation 2}$$

here, Yaw_Rate$_{Target}$ is a value determined by a driving situation, and has a value in a range of about −5 deg/s to about 5 deg/s.

Then, the MCU 150 compares the desired yaw rate value, which is calculated via the above Equation 1 and Equation 2, with a preset threshold value. The MCU 150 performs heading-angle control if the desired yaw rate value is less than the threshold value, and performs haptic control if the desired yaw rate value is equal to or greater than the threshold value. In this way, the MCU 150 assists a lane change manoeuvre.

In the case of controlling a heading-angle using a pressure difference between left and right wheels, a yaw rate of about 3~5 deg/s generally occurs due to road surface restraints. Thus, if the calculated desired yaw rate value is equal to or greater than 3~5 deg/s, haptic control that gives the driver a warning using haptic techniques to assist the driver in handling a dangerous situation may be better than heading-angle control that sets a heading-angle of the vehicle via control of a pressure difference between left and right wheels to ensure that the vehicle moves to a safe zone. The heading-angle control and the haptic control will be described below in detail with reference to FIGS. 3 and 4.

The storage unit 160 stores the threshold value, which will be compared with the calculated desired yaw rate value when determining whether to perform the heading-angle control or to perform the haptic control in order to assist the lane change manoeuvre.

A brake system 200 serves to decelerate or stop the vehicle, or to maintain the vehicle at any position. The brake system 200 includes an MCU 210 to control the entire braking operation of the vehicle. The MCU 210 calculates a target wheel pressure value for the heading-angle control for lane change assistance upon receiving the calculated heading-angle value and target moment value from the MCU 150 of the lane change assistance system 100, and transmits the calculated target wheel pressure to the master cylinder (not shown).

A wheel unit 300 includes a wheel cylinder 310 that performs braking of the vehicle by generating braking force using pressure supplied from a master cylinder (not shown).

A haptic device 400 is configured to come into contact with a particular portion of the driver's body so as to apply force to the contact body portion in response to a feedback drive signal that is generated according to wheel pressure variation.

Figure 2:
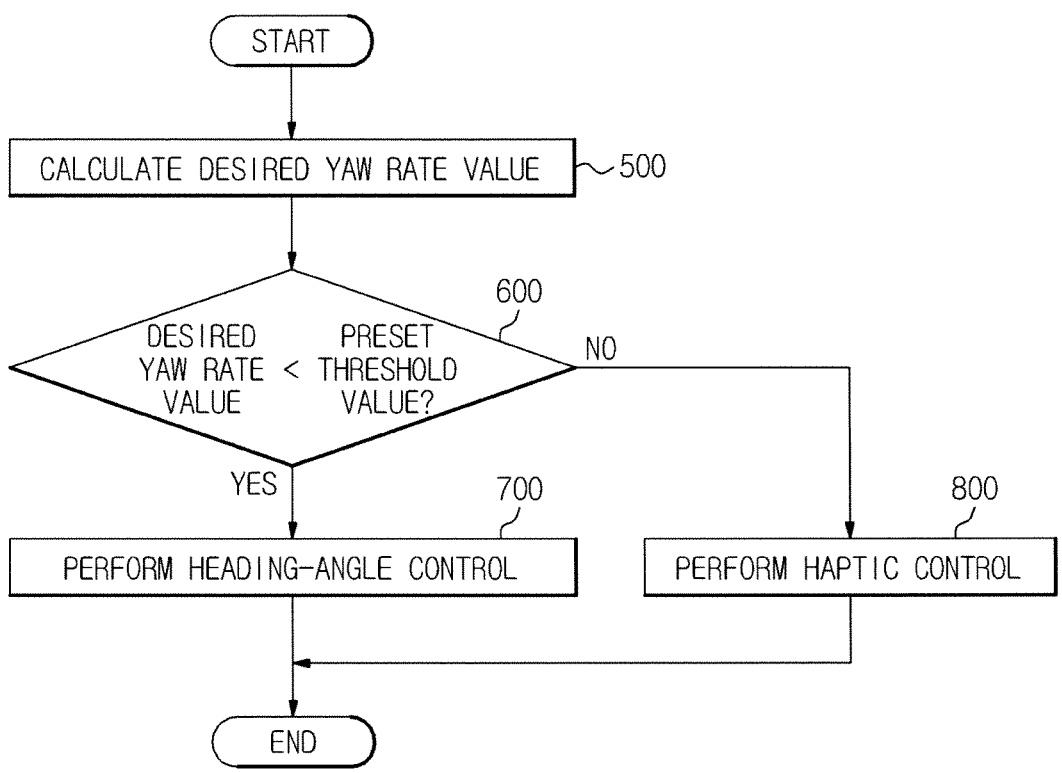
FIG. 2 is a flowchart illustrating a lane change assistance method of a vehicle according to an embodiment of the present invention.

Hereinafter, a lane change assistance method of the vehicle according to the embodiment of the present invention will be described with reference to FIG. 2.

A precondition for explanation of an operation according to the embodiment of the present invention is that the storage unit 160 stores the threshold value to be compared with the calculated desired yaw rate value as advance information to judge whether to perform the heading-angle control or to perform the haptic control for assistance of the lane change manoeuvre.

First, the MCU 150 of the lane change assistance system 100 calculates a desired yaw rate value, which is required to allow the vehicle to return to an original lane when a driver attempts to move the vehicle to an adjacent lane, but another vehicle in the adjacent lane threatens the corresponding vehicle, using the above-described Equation and Equation 2 (500).

Thereafter, the MCU 150 judges whether the calculated desired yaw rate value is less than a preset threshold value (600). If it is judged that the desired yaw rate value is less than the threshold value ('Yes' in Operation 600), the MCU 150 performs heading-angle control for assistance of the lane change manoeuvre (700).

On the other hand, if the desired yaw rate value is equal to or greater than the threshold value ('No' in Operation 600), the MCU 150 performs haptic control for assistance of the lane change manoeuvre (800).

Figure 3:
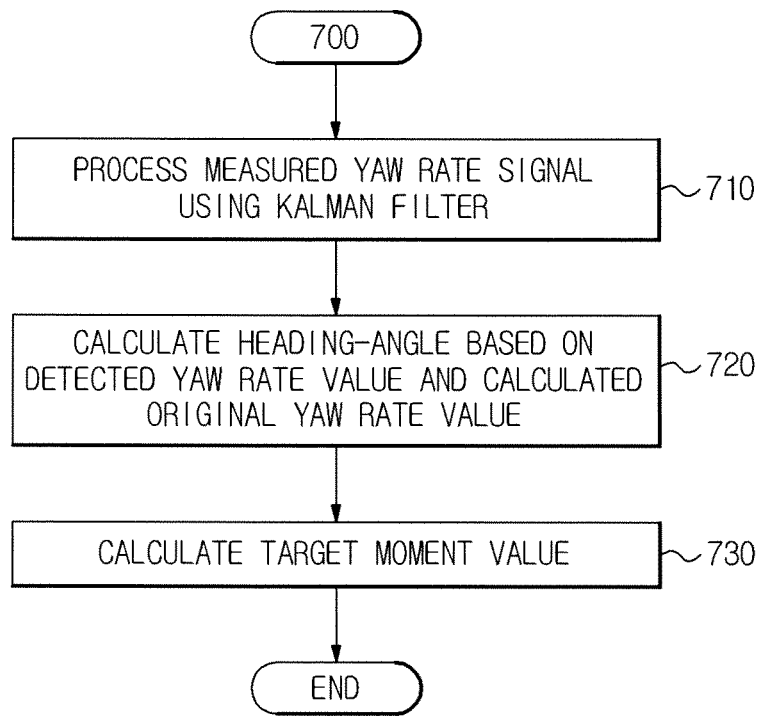
FIG. 3 is a flowchart illustrating a heading-angle control operation illustrated in FIG. 2 in detail.

Hereinafter, the heading-angle control operation (Operation 700) illustrated in FIG. 2 will be described in detail with reference to FIG. 3.

To perform the heading-angle control for assistance of the lane change manoeuvre, the MCU 150 processes a measured yaw rate signal using a Kalman filter (710). The measured yaw rate signal may be simply processed via modeling of a preliminary system using Equation 3 and Equation 4 that is a Kalman filter equation.

$$\dot{\gamma} = a \cdot \gamma + b \cdot a_y + c \cdot \delta_f + d \cdot M_z \qquad \text{Equation 3}$$

where $$a = -\frac{2C_f C_r}{l_f + l_v} \frac{(C_f + C_r)^2}{I_z V_x}$$

$$b = \frac{m(l_f C_f - l_r C_r)}{(C_f + C_r) I_z}$$

$$c = \frac{2C_f C_r}{C_f + C_r} \frac{l_f + l_r}{I_z}$$

$$d = \frac{1}{I_z}$$

here, "$l_f$" is distance from a front-wheel axle to the center of gravity,

"$l_r$" is distance from a rear-wheel axle to the center of gravity,

"m" is mass

"$\gamma$" is yaw rate

"$\delta$" is steering angle,

"$a_y$" is lateral acceleration, and

"$M_z$" is target moment.

$$\hat{\gamma}_k^- = (1 + a \cdot T) \cdot \gamma_{k-1} + b \cdot T \cdot a_{y,k} + c \cdot T \cdot \delta_{f,k} + d \cdot T \cdot M_{z,k}$$

$$P_k^- = (1 + a \cdot T) \cdot P_{k-1} \cdot (1 + a \cdot T) + Q_{k-1}$$

$$K_k = P_k^- \cdot (P_k^- + R_k)^{-1}$$

$$\hat{\gamma}_k = \hat{\gamma}_k^- + K_k \cdot (z_k - \hat{\gamma}_k^-)$$

$$P_k = (1 - K_k) \cdot P_k^- \qquad \text{Equation 4}$$

Next, the MCU 150 calculates a heading-angle or a yaw angle based on the yaw rate value detected by the yaw rate sensor 130 as represented by the following Equation 5 and the original yaw rate value calculated via the above-described Equation 1 (720).

$$\psi_{des} = \int (\text{Yaw\_Rate}_{Measured} - \text{Yaw\_Rate}_{Original}) dt \qquad \text{Equation 5}$$

Thereafter, the MCU 150 calculates a target moment value using the following Equation 6 (730).

$$M_z = \left(-a \cdot \gamma - b \cdot a_y - c \cdot \delta_f + \dot{\gamma}_d - K \cdot Sat\left(\frac{\gamma - \gamma_d}{\varepsilon}\right)\right) \cdot I_z \qquad \text{Equation 6}$$

where $$a = -\frac{2C_f C_r}{l_f + l_r} \frac{(C_f + C_r)^2}{I_z V_x}$$

$$b = \frac{m(l_f C_f - l_r C_r)}{(C_f + C_r) I_z}$$

$$c = \frac{2C_f C_r}{C_f + C_r} \frac{l_f + l_r}{I_z}$$

Next, the MCU 150 transmits information on the heading angle calculated via the above Equation 5 and the target moment value calculated via the above Equation 6 to the brake system 200. The brake system 200 performs control of a pressure difference between left and right wheels upon receiving information on the heading angle and the target moment value from the MCU 150, thereby controlling the heading angle of the vehicle to orient the vehicle toward a safe zone.

Figure 4:
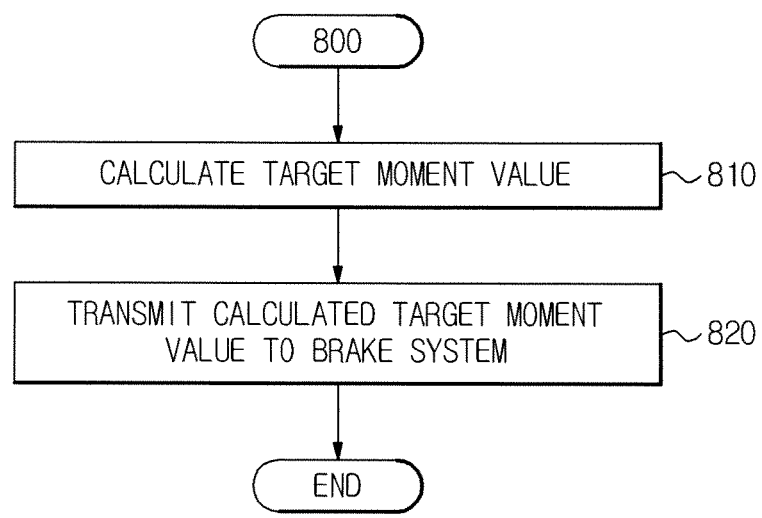
FIG. 4 is a flowchart illustrating a haptic control operation illustrated in FIG. 2 in detail.

Hereinafter, the haptic control operation (Operation 800) illustrated in FIG. 2 will be described in detail with reference to FIG. 4.

To perform the haptic control for assistance of the lane change manoeuvre, the MCU 150 calculates a target moment value using the following Equation 7 (810).

$$M_z = (-a \cdot \gamma - b \cdot a_y - c \cdot \delta_f + \dot{\gamma}_d - K \cdot |\gamma - \gamma_d|) \cdot I_z \qquad \text{Equation 7}$$

where $$a = -\frac{2C_f C_r}{l_f + l_r} \frac{(C_f + C_r)^2}{I_z V_x}$$

$$b = \frac{m(l_f C_f - l_r C_r)}{(C_f + C_r) I_z}$$

$$c = \frac{2C_f C_r}{C_f + C_r} \frac{l_f + l_r}{I_z}$$

Most sliding mode controllers perform chattering when reached a sliding surface. To prevent this phenomenon, a saturation function is utilized. In the above-described Equation 6, $$Sat\left(\frac{\gamma - \gamma_d}{\varepsilon}\right)$$

corresponds to the saturation function.

Accordingly, chattering occurs if the saturation function is omitted, and consequently wheel pressure variation occurs. This generates a feedback signal to the haptic device 400. As such, if the portion corresponding to the saturation function of the above Equation 6 is deformed as represented in Equation 7, a warning is issued to the driver via haptic techniques, which assists the driver in handling a dangerous situation.

Next, the MCU 150 transmits the target moment value calculated via the above-described Equation 7 to the brake system 200 (820). The brake system 200 performs a vehicle braking operation upon receiving the target moment value from the MCU 150. Wheel pressure variation occurs by the vehicle braking operation of the brake system 200, which generates a feedback signal to the haptic device 400. The driver may detect a dangerous situation via the haptic device 400, and prevent accidents by adopting an appropriate method.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A lane change assistance system of a vehicle, comprising:
   a wheel speed sensor to detect a wheel speed of the vehicle;
   a steering angle sensor to detect a steering angle of the vehicle; and
   a micro controller unit to calculate, using the wheel speed and the steering angle, a desired yaw rate value required to allow the vehicle to return to an original lane when attempting to move the vehicle to an adjacent lane, but another vehicle in the adjacent lane threatens the corresponding vehicle, to compare the desired yaw rate value with a preset threshold value, and to assist a lane change manoeuvre of the vehicle based on the comparison result.

2. The system according to claim 1, wherein the micro controller unit calculates the desired yaw rate value using Equation 1 and Equation 2 represented as follows:

$$\dot{\psi}_{dos} = \text{Yaw\_Rate}_{\_Original} + \text{Yaw\_Rate}_{\_Target} \quad \text{Equation 1}$$

here, Yaw_Rate$_{\_Target}$ is a value determined by a driving situation, and has a value in a range of about −5 deg/s to about 5 deg/s, and $$\text{Yaw\_Rate}_{\_Original} = \frac{V}{l_f + l_r + \frac{mV^2(l_r C_{ar} - l_f C_{af})}{2 C_{af} C_{ar} L}} \delta. \quad \text{Equation 2}$$

3. The system according to claim 2, wherein the micro controller unit performs heading-angle control if the desired yaw rate value is less than the preset threshold value, and performs haptic control if the desired yaw rate value is equal to or greater than the preset threshold value, thereby assisting the lane change manoeuvre of the vehicle.

4. The system according to claim 3, wherein the micro controller unit calculates a heading-angle using Equation 3 represented as follows and calculates a target moment value using Equation 4 represented as follows:

$$\psi_{des} = \int (\text{Yaw\_Rate}_{\_Measured} - \text{Yaw\_Rate}_{\_Original}) dt, \quad \text{Equation 3}$$

and $$M_z = \left(-a \cdot \gamma - b \cdot a_y - c \cdot \delta_f + \dot{\gamma}_d - K \cdot Sat\left(\frac{\gamma - \gamma_d}{\varepsilon}\right)\right) \cdot I_z \quad \text{Equation 4}$$

where $$a = -\frac{2 C_f C_r}{l_f + l_r} \frac{(C_f + C_r)^2}{I_z V_x}$$

$$b = \frac{m(l_f C_f - l_r C_r)}{(C_f + C_r) I_z}$$

$$c = \frac{2 C_f C_r}{C_f + C_r} \frac{l_f + l_r}{I_z}.$$

5. The system according to claim 4, wherein the micro controller unit performs the heading-angle control by transmitting the calculated heading-angle and the target moment value to a brake system.

6. The system according to claim 3, wherein the micro controller unit calculates a target moment value using Equation 5 represented as follows:

$$M_z = \left(-a \cdot \gamma - b \cdot a_y - c \cdot \delta_f + \dot{\gamma}_d - K \cdot Sat\left(\frac{\gamma - \gamma_d}{\varepsilon}\right)\right) \cdot I_z \quad \text{Equation 5}$$

where $$a = -\frac{2 C_f C_r}{l_f + l_r} \frac{(C_f + C_r)^2}{I_z V_x}$$

$$b = \frac{m(l_f C_f - l_r C_r)}{(C_f + C_r) I_z}$$

$$c = \frac{2 C_f C_r}{C_f + C_r} \frac{l_f + l_r}{I_z}.$$

7. The system according to claim 6, wherein the micro controller unit performs the haptic control by transmitting the calculated target moment value to a brake system.

8. A lane change assistance method of a vehicle including a wheel speed sensor to detect a wheel speed of the vehicle and a steering angle sensor to detect a steering angle of the vehicle, the method comprising:

calculating, using the wheel speed and the steering angle, a desired yaw rate value required to allow the vehicle to return to an original lane when attempting to move the vehicle to an adjacent lane, but another vehicle in the adjacent lane threatens the corresponding vehicle;

comparing the desired yaw rate value with a preset threshold value; and assisting a lane change manoeuvre of the vehicle based on the comparison result.

9. The method according to claim 8, wherein the calculation of the desired yaw rate value is performed using Equation 1 and Equation 2 represented as follows:

$$\dot{\psi}_{dos} = \text{Yaw\_Rate}_{\_Original} + \text{Yaw\_Rate}_{\_Target} \quad \text{Equation 1}$$

here, Yaw_Rate$_{\_Target}$ is a value determined by a driving situation, and has a value in a range of about −5 deg/s to about 5 deg/s, and $$\text{Yaw\_Rate}_{\_Original} = \frac{V}{l_f + l_r + \frac{mV^2(l_r C_{ar} - l_f C_{af})}{2 C_{af} C_{ar} L}} \delta. \quad \text{Equation 2}$$

10. The method according to claim 9, wherein the assistance of the lane change manoeuvre of the vehicle includes performing heading-angle control if the desired yaw rate value is less than the preset threshold value, and performing haptic control if the desired yaw rate value is equal to or greater than the preset threshold value.

11. The method according to claim 10, further comprising calculating a heading-angle using Equation 3 represented as follows and calculating a target moment value using Equation 4 represented as follows:

$$\psi_{des} = \int (\text{Yaw\_Rate}_{\_Measured} - \text{Yaw\_Rate}_{\_Original}) dt, \quad \text{Equation 3}$$

and $$M_z = \left(-a \cdot \gamma - b \cdot a_y - c \cdot \delta_f + \dot{\gamma}_d - K \cdot Sat\left(\frac{\gamma - \gamma_d}{\varepsilon}\right)\right) \cdot I_z \quad \text{Equation 4}$$

where $$a = -\frac{2 C_f C_r}{l_f + l_r} \frac{(C_f + C_r)^2}{I_z V_x}$$

$$b = \frac{m(l_f C_f - l_r C_r)}{(C_f + C_r) I_z}$$

$$c = \frac{2 C_f C_r}{C_f + C_r} \frac{l_f + l_r}{I_z}.$$

12. The method according to claim 11, further comprising transmitting the calculated heading-angle and the target moment value to a brake system to enable implementation of the heading-angle control.

13. The method according to claim 10, further comprising calculating a target moment value using Equation 5 represented as follows:

$$M_z = \left(-a \cdot \gamma - b \cdot a_y - c \cdot \delta_f + \dot{\gamma}_d - K \cdot Sat\left(\frac{\gamma - \gamma - d}{\varepsilon}\right)\right) \cdot I_z \quad \text{Equation 5}$$

where $$a = -\frac{2C_f C_r}{l_f + l_r} \frac{(C_f + C_r)^2}{I_z V_x}$$

$$b = \frac{m(l_f C_f - l_r C_r)}{(C_f + C_r)I_z}$$

$$c = \frac{2C_f C_r}{C_f + C_r} \frac{l_f + l_r}{I_z}.$$

14. The method according to claim 13, further comprising transmitting the calculated target moment value to a brake system to enable implementation of the haptic control.

\* \* \* \* \*